US008530616B2

(12) United States Patent
Jeong et al.

(10) Patent No.: US 8,530,616 B2
(45) Date of Patent: Sep. 10, 2013

(54) PRECISE CONTROL OF MOLECULAR WEIGHT AND CHAIN SHAPE CONTROL IN CARBON DIOXIDE/EPOXIDE ALTERNATING COPOLYMERIZATION AND PREPARATION OF LOW MOLECULAR WEIGHT POLY(ALKYLENE CARBONATE) THEREBY (75) Inventors: Jisu Jeong, Daejeon (KR); SungJae Na, Daejeon (KR); Sujith Sudevan, Daejeon (KR); Myungahn Ok, Daejeon (KR); YoungGyu Han, Daejeon (KR); KwangJin Chung, Daejeon (KR); Bun Yeoul Lee, Suwon-si (KR); Anish Cyriac, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 183 days.

(21) Appl. No.: 12/952,642

(22) Filed: Nov. 23, 2010

(65) Prior Publication Data
US 2011/0245424 A1 Oct. 6, 2011

(30) Foreign Application Priority Data

Apr. 6, 2010 (KR) ........................ 10-2010-0031457

(51) Int. Cl.
*C08G 59/68* (2006.01)
*C08G 65/10* (2006.01)
*C08G 59/00* (2006.01)
*C08G 65/04* (2006.01)

(52) U.S. Cl.
USPC ........... 528/412; 528/405; 528/410; 528/421; 528/502 R (58) Field of Classification Search
USPC ...................... 528/405, 410, 502 R, 412, 421
See application file for complete search history.

(56) References Cited

U.S. PATENT DOCUMENTS
2010/0029896 A1 2/2010 Ok et al.

FOREIGN PATENT DOCUMENTS

| CN | 1060299 | 4/1992 |
|---|---|---|
| EP | 0222453 B1 | 3/1993 |
| EP | 0311278 B1 | 11/1994 |
| EP | 0302712 B1 | 11/1996 |
| EP | 0798328 A2 | 10/1997 |
| KR | 100853358 B1 | 8/2008 |
| KR | 1020090090154 A | 8/2009 |
| KR | 1020100013255 A | 2/2010 |
| WO | 9857671 A2 | 12/1998 |
| WO | 2008136591 A1 | 11/2008 |

OTHER PUBLICATIONS

Kim et al., "Cobalt(III) Complexes of Various Salen-Type Ligand Bearing Four Quaternary Ammonium Salts and Their Reactivity for CO2/Epoxide Copolymerization", Bull. Korean Chem. Soc., 2010, vol. 31, No. 4, pp. 829-834.

(Continued)

*Primary Examiner* — Duc Truong
(74) *Attorney, Agent, or Firm* — The Webb Law Firm (57) ABSTRACT This invention relates to a method of preparing poly(alkylene carbonate) that has a molecular weight and polymer chain structure precisely controlled by adding a chain transfer agent composed of a compound having an alcohol or carboxylic acid functional group upon alternating copolymerization of an epoxide compound and carbon dioxide using a catalyst composed of a trivalent metal complex compound synthesized from a quaternary ammonium salt-containing Salen type ligand, and to a polymer compound prepared thereby. According to this invention, the polymer compound having a star-shaped chain as well as the polymer having a linear chain can be prepared. The low-molecular-weight poly(alkylene carbonate) has an —OH terminal group and can be used alone as a coating agent, etc., and also in mixtures with an isocyanate compound and thus can be easily utilized to prepare polyurethane.

14 Claims, 3 Drawing Sheets

(56) References Cited

OTHER PUBLICATIONS

Min et al., "Efficient Synthesis of a Highly Active Catalyst for CO2/Epoxide Copolymerization", Bull. Korean Chem. Soc., 2009, vol. 30, No. 3, pp. 745-748.

Na et al., "Elucidation of the Structure of a Highly Active Catalytic System for CO2/Epoxide Copolymerization: A salen-Cobaltate Complex of an Unusual Binding Mode", Inorg. Chem., 2009, vol. 48, pp. 10455-10465.

Noh et al., "Two Components in a Molecule: Highly Efficient and Thermally Robust Catalytic System for CO2/Epoxide Copolymerization", J. Am. Chem. Soc., 2007, vol. 129, No. 6, pp. 8082-8083.

Cao et al., "Crosslinked polycarbonate polyurethanes: preparation and physical properties", Polymer, 1992, vol. 33, No. 7, pp. 1384-1390.

Kuran, "Poly(Propylene Carbonate)", Polymeric Materials Encyclopedia, 1996, (J.C. Salamone, ed.), pp. 6623-6630.

Harris et al., "Polyurethane Elastomers Based on Molecular Weight Advanced Poly(ethylene Ether Carbonate) Diols. I. Comparison to Commercial Diols", J. Appl. Polymer Sci., 1990, vol. 41, pp. 487-507.

Gunatillake et al., "Synthesis and Characterization of a Series of Poly(alkylene carbonate) Macrodiols and the Effect of Their Structure on the Properties of Polyurethanes", J. Appl. Polymer Sci., 1998, vol. 69, pp. 1621-1633.

Harris et al., "Structural Features of Poly(Alkylene Ether Carbonate) Diols and Intermediates Formed during Their Preparation", J. Appl. Polymer Sci., 1989, vol. 37, pp. 1491-1511.

Sujith et al., "A Highly Active and Recyclable Catalytic System for CO2/Propylene Oxide Copolymerization", Angew. Chem. Int. Ed., 2008, vol. 47, pp. 7306-7309.

PRECISE CONTROL OF MOLECULAR WEIGHT AND CHAIN SHAPE CONTROL IN CARBON DIOXIDE/EPOXIDE ALTERNATING COPOLYMERIZATION AND PREPARATION OF LOW MOLECULAR WEIGHT POLY(ALKYLENE CARBONATE) THEREBY

BACKGROUND OF THE INVENTION

1. Technical Field

The present invention relates to a method of precisely controlling the molecular weight and chain shape of a polymer using a compound having an alcohol or carboxylic acid functional group as a chain transfer agent when carrying out a process of preparing an alternating copolymer of carbon dioxide and epoxide using a catalyst comprising a trivalent metal complex synthesized from a quaternary ammonium salt-containing Salen type ligand, and to a low-molecular-weight poly(alkylene carbonate) compound prepared thereby.

2. Description of the Related Art

Poly(alkylene carbonate) is a polymer which is easily biodegradable, and is useful as an exemplary example of a packaging or coating material. Preparation of poly(alkylene carbonate) from an epoxide compound and carbon dioxide is very environmentally friendly because phosgene which is poisonous is not used and carbon dioxide may be inexpensively obtained.

Many researchers have developed various types of catalysts in order to produce poly(alkylene carbonate) from an epoxide compound and carbon dioxide since 1960. The present inventors have recently disclosed a catalyst having high activity and high selectivity synthesized from a quaternary ammonium salt-containing Salen[$H_2$Salen=N,N'-bis(3,5-dialkylsalicylidene)-1,2-ethylenediamine] type ligand [Bun-Yeoul Lee, Korean Patent No. 10-0853358 (issue date: 2008.08.13); Bun-Yeoul Lee, Sujith S, Eun-Kyung Noh, Jae-Ki Min, Korean Patent Application No. 10-2008-0015454 (filing date: 2008.02.20); Bun-Yeoul Lee, Sujith S, Eun-Kyung Noh, Jae-Ki Min, PCT/KR2008/002453 (filing date: 2008.04.30); Eun-Kyung Noh, Sung-Jae Na, Sujith S, Sang-Wook Kim, and Bun-Yeoul Lee *J. Am. Chem. Soc.* 2007, 129, 8082-8083 (2007.07.04); Sujith S, Jae-Ki Min, Jong-Eon Seong, Sung-Jae Na, and Bun-Yeoul Lee, *Angew. Chem. Int. Ed.*, 2008, 47, 7306-7309 (2008.09.08)]. The catalyst disclosed by the present inventors may be highly active and highly selective and enables the preparation of a copolymer having high molecular weight and polymerization to be carried out even at high temperature and thus may be applied to commercial processes. Furthermore, this catalyst is advantageous because a quaternary ammonium salt is contained in the ligand, and thus the catalyst may be easily separated from a copolymer resulting from copolymerization of carbon dioxide and epoxide, and re-used.

Also, the present inventors have carefully examined a catalyst having higher activity and higher selectivity among the catalyst group of the above patent and thus have proved that such a catalyst has a peculiar structure in which a nitrogen atom of the Salen ligand is not coordinated but only an oxygen atom is coordinated to a metal, which was not known to date (see Structure 1 below, Sung-Jae Na, Sujith S, Anish Cyriac, Bo-Eun Kim, Jina Yoo, Youn K. Kang, Su-Jung Han, Chongmok Lee, and Bun-Yeoul Lee "Elucidation of the Structure of A Highly Active Catalytic System for $CO_2$/Epoxide Copolymerization: A Salen-Cobaltate Complex of An Unusual Binding Mode" *Inorg. Chem.* 2009, 48, 10455-10465).

X = 2,4-dinitrophenolate Y = X or [X...H...X]

Furthermore, a method of easily synthesizing the ligand of the compound of Structure 1 has been developed (Min, J.; Seong, J. E.; Na, S. J.; Cyriac, A.; Lee, B. Y. *Bull. Korean Chem. Soc.* 2009, 30, 745-748).

High-molecular-weight poly(alkylene carbonate) may be economically prepared using the compound of Structure 1 as a highly active catalyst. However, because poly(alkylene carbonate) has a low glass transition temperature (which is 40° C. in the case of poly(alkylene carbonate) prepared from propylene oxide and carbon dioxide) and has insufficient mechanical strength, predetermined limitations are imposed on the applications that can be developed therewith.

With the goal of overcoming the limitations of poly(alkylene carbonate), methods of preparing poly(alkylene carbonate)polyol having low molecular weight and a plurality of —OH terminal groups and preparing polyurethane therefrom have been developed. Polyurethane is a polymer obtained by reacting a compound having an —OH group with a compound having an isocyanate (—NCO) group thus forming a urethane bond (—NHC(O)O—). A variety of compounds having an —NCO group and compounds having an —OH group are being developed, and thermoplastic or thermosetting plastics or elastomeric polyurethanes having various properties have been developed and used. Polyurethane is prepared and used in an amount of about twelve million tons all over the world in 2007, and the amount thereof is increased by 5% per year and the applications thereof have become wide. Examples of the compound having an —OH group include diols and polyester diols having —OH terminal groups, which have thousands of molecular weights obtained by ring-opening polymerization of ethylene oxide or propylene oxide. Attempts have been made to prepare poly(alkylene carbonate)diol or polyol to be used instead of poly(alkylene oxide)diol or polyester diol in order to attain polyurethane (W. Kuran, in: Polymeric Materials Encyclopedia, J. C. Salamone, Ed. CRC Press, Inc., Boca Raton 1996, Vol. 9, p. 6623; Polymer, 1992, vol 33, 1384). Polyurethane prepared from poly(alkylene carbonate)polyol is known to have higher hydrolyzability compared to urethane prepared from polyester polyol (EP 302712; U.S. Pat. No. 5,863,627), and is also reported to have greater antistatic effects (U.S. Pat. No. 4,931,486). Furthermore, thrombus coagulation resistance is reported to be high (WO 9857671).

EP 302712 (priority filing date: 1987.08.04) and EP 311278 (priority filing date: 1987.10.06) disclose copolycarbonate diol prepared by polycondensing diethylcarbonate (EtOC(O)OEt) and 1,6-hexanediol or 1,6-petandediol, and preparation of polyurethane therefrom. Also, U.S. Pat. No.

5,171,830 (filing date: 1991.08.16) discloses a method of synthesizing poly(alkylene carbonate) by polycondensing dialkyl carbonate (ROC(O)OR) and alpha,omega-alkanediol having 4 or more carbons in the presence of a base catalyst and preparation of a urethane resin using the same.

EP 798328A2 (priority filing date: 1996.03.28) discloses synthesis of polycarbonate copolyether diol using polycondensation of polyether diol and dimethylcarboante (MeOC(O)OMe).

Also, synthesis of poly(alkylene carbonate)macrodiol using polycondensation of various diols and ethylene carbonate and preparation of polyurethane using the same are disclosed in the Journal of Applied Polymer Science, 1998, 69, 1621-1633 and the Journal of Applied Polymer Science, 1989, 37, 1491-1511.

However, such poly(alkylene carbonate)polyol is not prepared using copolymerization of carbon dioxide and epoxide and also has a structure different from that of a copolymer of carbon dioxide and epoxide. Specifically, in order to prepare poly(alkylene carbonate) using polycondensation of ethylene carbonate or dialkyl carbonate, diol spaced apart by 3 or more carbons should be used. Namely, a carbonate bond has a structure connected by 3 or more carbons. Poly(alkylene carbonate) resulting from copolymerization of carbon dioxide and epoxide is configured such that a carbonate bond is connected by 2 carbons.

U.S. Pat. No. 4,686,276 (filing date: 1985.12.30) discloses a method of synthesizing poly(ethylene carbonate)diol by copolymerizing carbon dioxide and ethylene oxide in the presence or absence of ethylene carbonate using a catalyst comprising an alkaline compound and a tin compound and an initiator comprising a diol compound. Also, U.S. Pat. No. 4,528,364 (filing date: 1984.04.19) discloses a method of removing a catalyst from the prepared polymer compound. As such, the produced polymer has a carbon dioxide content of less than 30% and is not a complete alternating copolymer. In addition, preparation of polyurethane using poly(ethylene carbonate)diol which was prepared and purified by the above method is disclosed in the Journal of Applied Polymer Science, 1990, 41, 487-507.

EP 0222453 (filing date: 1986.06.11) discloses a method of synthesizing polyol by copolymerizing carbon dioxide and epoxide using an organic material having a reactive proton as a chain transfer agent in the presence of a double metal cyanide compound as a catalyst. However, the obtained polyol has a carbon dioxide content of 5~13 mol % and is not a pure poly(alkylene carbonate) compound based on complete alternating copolymerization of carbon dioxide and epoxide.

CN 1060299A (filing date: 1991.09.19), which is published later, discloses a method of preparing polyol by copolymerizing carbon dioxide and epoxide using an organic material having 1~10 reactive protons as a chain transfer agent in the presence of a polymer-supported bimetallic catalyst. However, the polyol thus obtained has a carbon dioxide content of 37~40 mol % and is thus not a pure poly(alkylene carbonate) compound based on complete alternating copolymerization of carbon dioxide and epoxide.

There are many reports related to synthesis of low-molecular-weight poly(alkylene carbonate) using alternating copolymerization of carbon dioxide and epoxide. The copolymerization of carbon dioxide and epoxide is a living or immortal polymerization in which a polymer chain is grown from the chain initiator of the catalyst. For this reason, when the activity of the catalyst is low, a low-molecular-weight polymer is obtained. Most catalysts, except for the catalyst developed by the present inventors as mentioned above, have low activity, resulting in poly(alkylene carbonate) having a low molecular weight of 50,000 or less. However, the preparation of low-molecular-weight poly(alkylene carbonate) using a catalyst having low activity requires a large amount of catalyst, negating monetary benefits. Furthermore, because the polymer chain grows in one direction from the chain initiator of the catalyst, one end of the chain has the chain initiator of the catalyst and the other end thereof has —OH. Typically, the chain initiator included in the catalyst is alkoxy, aryloxy, carboxyl or halide. When the polymer chain has such a shape, it cannot be used to prepare polyurethane even when having low molecular weight.

SUMMARY OF THE INVENTION

Accordingly, the present invention has been made keeping in mind the problems encountered in the related art and the present invention is intended to provide a method of preparing low-molecular-weight poly(alkylene carbonate) having precisely controlled molecular weight and chain shape by adding a chain transfer agent to complete alternating copolymerization of carbon dioxide and epoxide using a highly active catalyst which was already developed, and also to provide a pure poly(alkylene carbonate) compound prepared using the above method.

Also the present invention is intended to provide a pure poly(alkylene carbonate) which is used alone in a variety of applications including a coating agent, and may be reacted with an isocyanate compound and thus utilized to prepare polyurethane.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Hereinafter, embodiments of the present invention will be described in detail.

The present invention provides a method of preparing poly(alkylene carbonate), comprising alternating copolymerizing carbon dioxide and one or more epoxide compounds selected from the group consisting of (C2-C20)alkylene oxide substituted or unsubstituted with halogen, (C1-C20)alkyloxy, (C6-C20)aryloxy or (C6-C20)ar(C1-C20)alkyloxy; (C4-C20)cycloalkylene oxide substituted or unsubstituted with halogen, (C1-C20)alkyloxy, (C6-C20)aryloxy or (C6-C20)ar(C1-C20)alkyloxy; and (C8-C20)styrene oxide substituted or unsubstituted with halogen, (C1-C20)alkyloxy, (C6-C20)

aryloxy, (C6-C20)ar(C1-C20)alkyloxy or (C1-C20)alkyl in the presence of a compound represented by Formula 5 below using a complex compound represented by Formula 1 below as a catalyst.

[Formula 1]

In Formula 1, M is trivalent cobalt or trivalent chromium;
A is an oxygen or sulfur atom;
Q is a diradical that connects two nitrogen atoms;
$R^1$ to $R^{10}$ are each independently hydrogen; halogen; (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a metalloid radical of Group 14 metal substituted with hydrocarbyl;
two of $R^1$ to $R^{10}$ may be linked with each other to form a ring;
at least one of hydrogens included in $R^1$ to $R^{10}$ and Q is a proton group selected from among Formula a, Formula b and Formula c as represented below:

$X^-$ is independently a halogen anion; $HCO_3^-$; $BF_4^-$; $ClO_4^-$; $NO_3^-$; $PF_6^-$; a (C6-C20)aryloxy anion; a (C6-C20)aryloxy anion containing one or more selected from among a halogen atom, a nitrogen atom, an oxygen atom, a silicon atom, a sulfur atom and a phosphorus atom; a (C1-C20)alkylcarboxyl anion; a (C1-C20)alkylcarboxyl anion containing one or more selected from among a halogen atom, a nitrogen atom, an oxygen atom, a silicon atom, a sulfur atom and a phosphorus atom; a (C6-C20)arylcarboxyl anion; a (C6-C20)arylcarboxyl anion containing one or more selected from among a halogen atom, a nitrogen atom, an oxygen atom, a silicon atom, a sulfur atom and a phosphorus atom; a (C1-C20)alkoxy anion; a (C1-C20)alkoxy anion containing one or more selected from among a halogen atom, a nitrogen atom, an oxygen atom, a silicon atom, a sulfur atom and a phosphorus atom; a (C1-C20)alkylcarbonate anion; a (C1-C20)alkylcarbonate anion containing one or more selected from among a halogen atom, a nitrogen atom, an oxygen atom, a silicon atom, a sulfur atom and a phosphorus atom; a (C6-C20)arylcarbonate anion; a (C6-C20)arylcarbonate anion containing one or more selected from among a halogen atom, a nitrogen atom, an oxygen atom, a silicon atom, a sulfur atom and a phosphorus atom; a (C1-C20)alkylsulfonate anion; a (C1-C20)alkylsulfonate anion containing one or more selected from among a halogen atom, a nitrogen atom, an oxygen atom, a silicon atom, a sulfur atom and a phosphorus atom; a (C1-C20)alkylamido anion; a (C1-C20)alkylamido anion containing one or more selected from among a halogen atom, a nitrogen atom, an oxygen atom, a silicon atom, a sulfur atom and a phosphorus atom; a (C6-C20)arylamido anion; a (C6-C20)arylamido anion containing one or more selected from among a halogen atom, a nitrogen atom, an oxygen atom, a silicon atom, a sulfur atom and a phosphorus atom; a (C1-C20)alkylcarbamate anion; a (C1-C20)alkylcarbamate anion containing one or more selected from among a halogen atom, a nitrogen atom, an oxygen atom, a silicon atom, a sulfur atom and a phosphorus atom; a (C6-C20)arylcarbamate anion; or a (C6-C20)arylcarbamate anion containing one or more selected from among a halogen atom, a nitrogen atom, an oxygen atom, a silicon atom, a sulfur atom and a phosphorus atom;
Z is a nitrogen or phosphorus atom;
$R^{21}$, $R^{22}$, $R^{23}$, $R^{31}$, $R^{32}$, $R^{33}$, $R^{34}$ and $R^{35}$ are each independently (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; or a metalloid radical of Group 14 metal substituted with hydrocarbyl; two of $R^{21}$, $R^{22}$ and $R^{23}$ or two of $R^{31}$, $R^{32}$, $R^{33}$, $R^{34}$ and $R^{35}$ may be linked with each other to form a ring;
$R^{41}$, $R^{42}$ and $R^{43}$ are each independently hydrogen; (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; or a metalloid radical of Group 14 metal substituted with hydrocarbyl; two of $R^{41}$, $R^{42}$ and $R^{43}$ may be linked with each other to form a ring;
X' is an oxygen atom, a sulfur atom or N—R (wherein R is (C1-C20)alkyl);

n is an integer obtained by adding 1 to the total number of proton groups included in $R^1$ to $R^{10}$ and Q;

$X^-$ may be coordinated to M; and a nitrogen atom of imine may be decoordinated from M.

$$J(LH)_c \qquad [\text{Formula 5}]$$

In Formula 5, J is a C1-C60 hydrocarbyl c-valent radical with or without an ether group, an ester group or an amine group; LH is —OH or —$CO_2H$; and c is an integer from 1 to 10, in which LH may be identical or different when c is 2 or more.

The copolymerization of carbon dioxide and epoxide using the compound represented by Formula 1 as a catalyst is patented by the present inventors and published in the journal (Korean Patent No. 10-0853358; *J. Am. Chem. Soc.* 2007, 129, 8082-8083; *Angew. Chem. Int. Ed.*, 2008, 47, 7306-7309), but copolymerization of carbon dioxide and epoxide using the compound represented by Formula 5 as a chain transfer agent according to the present invention is not known. Scheme 1 below shows a polymer chain growing process in the presence of a chain transfer agent. The copolymerization of carbon dioxide and epoxide is initiated by nucleophilic attacking $X^-$ of the Formula 1 type catalyst to the epoxide coordinated to a metal acting as a Lewis acid. When a polymerization reaction is initiated, a polymer chain begins to grow from $X^-$ of the catalyst, and ultimately, $X^-$ comes to be a polymer chain the terminal group of which is a carbonate or alkoxy anion. The carbonate or alkoxy anion is converted into a compound in alcohol or carbonic acid form together with a proton of the $J(LH)_c$ compound represented by Formula 5 added as the chain transfer agent, and the $J(LH)_c$ compound is to be a carboxyl or alkoxy anion. When the $J(LH)_c$ compound becomes a carboxyl or alkoxy anion, a polymer chain may be grown therefrom. The proton exchange reaction may occur quite rapidly. The polymer material resulting from the proton exchange and chain growth reactions includes a polymer chain grown from $X^-$ of the catalyst and also a polymer chain grown from the $J(LH)_c$ compound added as the chain transfer agent. The molecular weight and chain shape of the resulting polymer may be adjusted depending on the amount and structure of the added chain transfer agent.

Preferably in Formula 1, M is trivalent cobalt; A is oxygen; Q is trans-1,2-cyclohexylene, phenylene or ethylene; $R^1$ and $R^2$, which are identical or different, are (C1-C20)primary alkyl; $R^3$ to $R^{10}$ are each independently hydrogen or —$[YR^{51}_{3-a}\{(CR^{52}R^{53})_bN^+R^{54}R^{55}R^{56}\}_a]$; Y is C or Si; $R^{51}$, $R^{52}$, $R^{53}$, $R^{54}$, $R^{55}$ and $R^{56}$ are each independently hydrogen; halogen; (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20) alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a metalloid radical of Group 14 metal substituted with hydrocarbyl, two of $R^{54}$, $R^{55}$ and $R^{56}$ being linked with each other to form a ring; a is an integer from 1 to 3, and b is an integer from 1 to 20; n is an integer of 4 or more obtained by adding 1 to the total number of quaternary ammonium salts included in $R^3$ to $R^{10}$, provided that a complex compound in which at least three of $R^3$ to $R^{10}$ are —$[YR^{51}_{3-a}\{(CR^{52}R^{53})_bN^+R^{54}R^{55}R^{56}\}_a]$ when a is 1, at least two of $R^3$ to $R^{10}$ are —$[YR^{51}_{3-a}\{(CR^{52}R^{53})_bN^+R^{54}R^{55}R^{56}\}_a]$ when a is 2, or one or more of $R^3$ to $R^{10}$ are —$[YR^{51}_{3-a}\{(CR^{52}R^{53})_bN^+R^{54}R^{55}R^{56}\}_a]$ when a is 3 may be used as a catalyst.

Specifically, used as the above catalyst is a complex compound represented by Formula 6 below.

[Formula 6]

In Formula 6, Q is trans-1,2-cyclohexylene, phenylene or ethylene;

$R^1$ and $R^2$ which are identical or different are (C1-C20) primary alkyl;

$R^3$ to $R^{10}$ are each independently hydrogen or —$[YR^{51}_{3-a}\{(CR^{52}R^{53})_bN^+R^{54}R^{55}R^{56}\}_a]$;

Y is C or Si;

[Scheme 1]

gen, oxygen, silicon, sulfur and phosphorus; (C1-C20) alkoxy; (C6-C30)aryloxy; formyl; (C1-C20)alkylcarbonyl; (C6-C20)arylcarbonyl; or a metalloid radical of Group 14 metal substituted with hydrocarbyl, two of $R^{54}$, $R^{55}$ and $R^{56}$ being linked with each other to form a ring;

a is an integer from 1 to 3, and b is an integer from 1 to 20;

$X^-$ is independently a halogen anion; $HCO_3^-$; $BF_4^-$; $ClO_4^-$; $NO_3^-$; $PF_6^-$; a (C6-C20)aryloxy anion; a (C6-C20) aryloxy anion containing one or more selected from among a halogen atom, a nitrogen atom, an oxygen atom, a silicon atom, a sulfur atom and a phosphorus atom; a (C1-C20) alkylcarboxyl anion; a (C1-C20)alkylcarboxyl anion containing one or more selected from among a halogen atom, a nitrogen atom, an oxygen atom, a silicon atom, a sulfur atom and a phosphorus atom; a (C6-C20)arylcarboxyl anion; a (C6-C20)arylcarboxyl anion containing one or more selected from among a halogen atom, a nitrogen atom, an oxygen atom, a silicon atom, a sulfur atom and a phosphorus atom; a (C1-C20)alkoxy anion; a (C1-C20)alkoxy anion containing one or more selected from among a halogen atom, a nitrogen atom, an oxygen atom, a silicon atom, a sulfur atom and a phosphorus atom; a (C1-C20)alkylcarbonate anion; a (C1-C20)alkylcarbonate anion containing one or more selected from among a halogen atom, a nitrogen atom, an oxygen atom, a silicon atom, a sulfur atom and a phosphorus atom; a (C6-C20)arylcarbonate anion; a (C6-C20)arylcarbonate anion containing one or more selected from among a halogen atom, a nitrogen atom, an oxygen atom, a silicon atom, a sulfur atom and a phosphorus atom; a (C1-C20)alkylsulfonate anion; a (C1-C20)alkylsulfonate anion containing one or more selected from among a halogen atom, a nitrogen atom, an oxygen atom, a silicon atom, a sulfur atom and a phosphorus atom; a (C1-C20)alkylamido anion; a (C1-C20) alkylamido anion containing one or more selected from among a halogen atom, a nitrogen atom, an oxygen atom, a silicon atom, a sulfur atom and a phosphorus atom; a (C6-C20)arylamido anion; a (C6-C20)arylamido anion containing one or more selected from among a halogen atom, a nitrogen atom, an oxygen atom, a silicon atom, a sulfur atom and a phosphorus atom; a (C1-C20)alkylcarbamate anion; a (C1-C20)alkylcarbamate anion containing one or more selected from among a halogen atom, a nitrogen atom, an oxygen atom, a silicon atom, a sulfur atom and a phosphorus atom; a (C6-C20)arylcarbamate anion; or a (C6-C20)arylcarbamate anion containing one or more selected from among a halogen atom, a nitrogen atom, an oxygen atom, a silicon atom, a sulfur atom and a phosphorus atom;

the total number of quaternary ammonium salts included in $R^3$ to $R^{10}$ is an integer of 3 or more; and n is an integer of 4 or more obtained by adding 1 to the total number of quaternary ammonium salts included in $R^3$ to $R^{10}$.

When $R^1$ and $R^2$ are primary alkyl and the number of quaternary ammonium salts included in the compound is 3 or more in Formula 6, it is known that a peculiar coordinator in which the nitrogen of an imine of Structure 1 is not coordinated is formed in the polymerization reaction and thus particularly exhibits high activity in the copolymerization of carbon dioxide and epoxide (*Inorg. Chem.* 2009, 48, 10455-10465; Bulletin of Korean Chemical Society 2010, 31, 829-834; Korean Patent Application No. 10-2008-0074435 (2008.07.30)). However, copolymerization of carbon dioxide and epoxide using the compound represented by Formula 5 as a chain transfer agent in the presence of such a catalyst is not known.

More preferably, used as the above catalyst is a complex compound of Formula 7 below.

[Formula 7]

In Formula 7, $R^{61}$ and $R^{62}$ are each independently methyl or ethyl; n is an integer from 1 to 20; $X^-$ is independently a nitrate or acetate anion; nitrogen of imine may be coordinated to or decoordinated from cobalt, and respective anions may be coordinated to cobalt.

The complex compound represented by Formula 7 which may be easily mass-produced and is thus very preferable in terms of commercialization is known by the present inventors (*Bull. Korean Chem. Soc.* 2009, 30, 745-748), but copolymerization of carbon dioxide and epoxide using the compound represented by Formula 5 as a chain transfer agent in the presence of this catalyst is not known.

In the compound represented by Formula 5, a compound in which c is 1; and J is a C1-C60 hydrocarbyl radical with or without an ether group, an ester group or an amine group may be used as the chain transfer agent.

Also in the compound represented by Formula 5, a compound in which c is 2; and J is a C1-C60 hydrocarbyl diradical with or without an ether group, an ester group or an amine group may be used as the chain transfer agent, and specifically may be selected from among a compound in which the structure of the compound represented by Formula 5 is $J(CO_2H)_2$ (J is $—[CR_2]_n—$ (n is an integer from 0 to 20; and R which is identical or different is hydrogen, methyl, ethyl, propyl or butyl), para-phenylene, meta-phenylene, ortho-phenylene or 2,6-naphthalenediyl), a compound in which the structure of the compound represented by Formula 5 is $J(OH)_2$ (J is $—[CR_2]_n—$ (n is an integer from 0 to 20; and R which is identical or different is hydrogen, methyl, ethyl, propyl or butyl), $—CH_2CH_2N(R)CH_2CH_2—$ (R is C1-C20 hydrocarbyl), or $—[CH_2CH(R)O]_nCH_2CH(R)—$ (n is an integer from 0 to 10; and R is hydrogen or methyl)), and a compound in which the structure of the compound represented by Formula 5 is $HO—C_6H_4—CO_2H$.

Also in the compound represented by Formula 5, a compound in which c is 3; and J is a C1-C60 hydrocarbyl triradical with or without an ether group, an ester group or an amine group may be used as the chain transfer agent. Specifically, there is a compound in which the structure of the compound represented by Formula 5 is $J(CO_2H)_3$ (J is 1,2,3-propanetriyl, 1,2,3-benzenetriyl, 1,2,4-benzenetriyl or 1,3,5-benzenetriyl).

Also in the compound represented by Formula 5, a compound in which c is 4; and J a C1-C60 hydrocarbyl tetraradical with or without an ether group, an ester group or an amine group may be used as the chain transfer agent. Specifically, there is a compound in which the structure of the compound represented by Formula 5 is $J(CO_2H)_4$ (J is 1,2,3,4-butanetetrayl or 1,2,4,5-benzenetetrayl).

Specific examples of the epoxide compound in the preparation method according to the present invention include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxidenorbornene, limonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxyrane, glycidyl-methylphenyl ether, chlorophenyl-2,3-epoxidepropyl ether, epoxypropyl methoxy phenyl ether, biphenyl glycidyl ether, and glycidyl naphthyl ether.

The epoxide compound may be used in polymerization using an organic solvent as a reaction medium, and examples of the solvent include aliphatic hydrocarbons such as pentane, octane, decane and cyclohexane, aromatic hydrocarbons such as benzene, toluene and xylene, and halogenated hydrocarbons such as chloromethane, methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene, which may be used alone or in combinations of two or more thereof. More preferably, bulk polymerization using a monomer itself as a solvent may be performed.

The molar ratio of epoxide to catalyst may range from 1,000 to 1,000,000, preferably from 50,000 to 200,000. Upon copolymerization, the carbon dioxide pressure may range from atmospheric pressure to 100 atm, preferably from 5 atm to 30 atm. Furthermore, the polymerization temperature may range from 20° C. to 120° C., preferably from 50° C. to 90° C.

The poly(alkylene carbonate) may be polymerized using batch polymerization, semi-batch polymerization, or continuous polymerization. When using batch or semi-batch polymerization, the reaction time may be set to the range of 0.5~24 hours, preferably 0.5~4 hours. On the other hand, when using continuous polymerization, an average residence time of the catalyst may also be set to the range of 0.5~4 hours.

According to another embodiment of the present invention, a method of preparing poly(alkylene carbonate) includes preparing poly(alkylene carbonate) using the above preparation process; and bringing a solution comprising the prepared copolymer and a catalyst dissolved therein into contact with a solid inorganic material, a solid polymer material or a mixture thereof which does not dissolve in the solution, thus forming a composite of the solid inorganic material or polymer material and the catalyst, thereby separating the copolymer and the catalyst from each other.

Copolymerization of carbon dioxide and epoxide using the same catalyst and then separation of the catalyst are known by the present inventors (Korean Patent Application No. 10-2008-0015454; *Angew. Chem. Int. Ed.,* 2008, 47, 7306-7309), but copolymerization using the compound represented by Formula 5 as a chain transfer agent and then separation of the catalyst are not known.

The solid inorganic material may be silica or alumina which has been surface modified or not, and the polymer material may be a polymer material having a functional group able to cause deprotonation by an alkoxy anion, in which the functional group able to cause deprotonation by an alkoxy anion may include a sulfonic acid group, a carboxylic acid group, a phenol group or an alcohol group.

Specific examples of the solid inorganic material composed mainly of silicon or aluminum having a Bronsted acid site which may function to supply a proton to an alkoxy anion or a carbonate anion include silica, alumina, aluminosilicate (zeolite), aluminophosphate, titanium silicate, and clay. Particularly useful is silica or alumina which has been surface modified or not.

The polymer material is preferably a material which is crosslinked with a number average molecular weight of 500~10,000,000, and also may be used so long as it does not dissolve in a solution including a copolymer and a catalyst even when not crosslinked. Specific examples of the polymer material having a functional group able to cause deprotonation by an alkoxy anion include copolymers comprising polymer chains including monomers represented by Formulas A to E below, or homopolymers composed exclusively of such monomers. As the polymer material acting as such a support, any material which is not crosslinked may be used as long as it does not dissolve in the aforementioned solution. However, it is preferable that a polymer material which is appropriately crosslinked is used to decrease solubility.

According to a further embodiment of the present invention, there is provided poly(alkylene carbonate) represented by Formula 10 below.

[Formula 10]

In Formula 10, L is —O— or —CO$_2$—;

c is an integer from 2 to 10, and L is identical or different;

J is a C1-C60 hydrocarbyl c-valent radical with or without an ether group, an ester group or an amine group;

$R^{81}$ to $R^{84}$ are each independently hydrogen; (C1-C10) alkyl substituted or unsubstituted with halogen or (C1-C20) alkoxy; (C6-C12)aryl substituted or unsubstituted with halogen or (C1-C20)alkoxy, $R^{81}$ to $R^{84}$ being linked with each other to form a ring; and a value obtained by multiplying d by c is a natural number of 1000 or less.

As described in the background, the structure of the polymer compound represented by Formula 10 in which c is 1 is the same as that of poly(alkylene carbonate) prepared using a conventional low active catalyst and thus cannot be claimed.

However, the polymer compound in which c is 2 or more is regarded as novel. As mentioned in the background, there are efforts for preparing polyurethane from a diol or polyol polymer compound synthesized by copolymerization of carbon dioxide and epoxide using an organic material having a reactive proton as an initiator or a chain transfer agent (U.S. Pat. No. 4,686,276; EP 0222453; CN 1060299A). However, such conventional catalysts have activity and performance considerably inferior to those of the catalyst according to the present invention, and are not adapted for commercial use and in particular fail to achieve complete alternating copolymerization of carbon dioxide and epoxide, yielding polymer compounds that partially or almost include only ether bonds, not carbonate bonds. Whereas, the catalyst according to the present invention can accomplish complete alternating copolymerization of carbon dioxide and an epoxide, resulting in pure poly(alkylene carbonate).

The maximum turnover number (TON) obtainable by the catalyst according to the present invention is about 20000. The polymer chain grows from $X^-$ of the catalyst and $J(LH)_c$ of the chain transfer agent. The catalyst having the structure represented by Formula 7 has five $X^-$s. When the preparation method according to the present invention is performed using such a catalyst, there exists a polymer chain which grows from at least five $X^-$s (see Scheme 1). In the case where the number of -LH functional groups of $J(LH)_c$ added as the chain transfer agent per the number of catalyst molecules is equal to or more than 15, the amount of the polymer chain grown from $J(LH)_c$ constitutes 75% or more of the total amount of a polymer including the polymer chain grown from $X^-$. For this reason, the value obtained by multiplying d by c in Formula 8 is set to the range of 1000 or less. When the value obtained by multiplying d by c is 1000 and the TON obtained in the copolymerization reaction is 20000, the number of -LH functional groups of $J(LH)_c$ added as the chain transfer agent per the number of catalyst molecules becomes 15 times the number of catalyst molecules. The minimum value obtained by multiplying d by c is determined by the obtained TON and the amount of added chain transfer agent $J(LH)_c$. Because there is no limitation in terms of the minimum TON and the maximum amount of added chain transfer agent $J(LH)_c$, the minimum value obtained by multiplying d by c is not limited. The value obtained by multiplying d by c may be measured using NMR spectrum analysis when the molecular weight is sufficiently low, and may be measured using universal calibration by GPC when the molecular weight is high.

The molecular weight distribution of the polymer obtained according to the present invention is considerably narrow when performing polymerization using a batch reactor ($M_w/M_n$<1.2). However, when a continuous reactor is used, the molecular weight distribution may become wider depending on the catalyst residence time distribution, and thus is not limited to the numerical value obtained using a batch reactor.

The low-molecular-weight poly(alkylene carbonate) polymer obtained according to the present invention may be used alone as a coating material, and may also be used in a blend with other polymers. Also, this polymer may be utilized to prepare polyurethane using an —OH terminal group thereof.

In addition, the polymer compound represented by Formula 10 may be a compound in which c is 2; J is a C1-C60 hydrocarbyl diradical with or without an ether group, an ester group or an amine group; $R^{81}$ to $R^{84}$ are each independently hydrogen or methyl; d is an integer from 5 to 500, preferably all of $R^{81}$ to $R^{84}$ are hydrogen, or all of $R^{81}$ to $R^{83}$ may be hydrogen and $R^{84}$ may be methyl (in some repeating unit, $R^{81}$ may be methyl and all of $R^{82}$ to $R^{84}$ may be hydrogen).

Also, the polymer compound represented by Formula 10 may be a compound in which c is 2; L is —$CO_2$—; and J is —$[CR_2]_n$— (n is an integer from 0 to 20; and R which is identical or different is hydrogen, methyl, ethyl, propyl or butyl), para-phenylene, meta-phenylene, ortho-phenylene or 2,6-naphthalenediyl, or a compound in which c is 2; L is —O—; and J is —$[CR_2]_n$— (n is an integer from 0 to 20; and R which is identical or different is hydrogen, methyl, ethyl, propyl or butyl), —$CH_2CH_2N(R)CH_2CH_2$— (R is C1-C20 hydrocarbyl), or —$[CH_2CH(R)O]_nCH_2CH(R)$— (n is an integer from 0 to 10; and R is hydrogen or methyl).

Also, the polymer compound represented by Formula 10 may be a compound in which c is 3; J is a C1-C60 hydrocarbyl triradical with or without an ether group, an ester group or an amine group; $R^{81}$ to $R^{84}$ are each independently hydrogen or methyl; and d is a natural number of 330 or less, and preferably all of $R^{81}$ to $R^{84}$ are hydrogen, or all of $R^{81}$ to $R^{83}$ may be hydrogen and $R^{84}$ may be methyl (in some repeating unit, $R^{81}$ may be methyl and all of $R^{82}$ to $R^{84}$ may be hydrogen).

Also, the polymer compound represented by Formula 10 may be a compound in which c is 3; L is —$CO_2$—; and J is 1,2,3-propanetriyl, 1,2,3-benzenetriyl, 1,2,4-benzenetriyl or 1,3,5-benzenetriyl.

Also, the polymer compound represented by Formula 10 may be a compound in which c is 4; J is a C1-C60 hydrocarbyl tetraradical with or without an ether group, an ester group or an amine group; $R^{81}$ to $R^{84}$ are each independently hydrogen or methyl; d is a natural number of 250 or less, and preferably all of $R^{81}$ to $R^{84}$ are hydrogen, or all of $R^{81}$ to $R^{83}$ may be hydrogen and $R^{84}$ may be methyl (in some repeating unit, $R^{81}$ may be methyl and all of $R^{82}$ to $R^{84}$ may be hydrogen).

Also, the polymer compound represented by Formula 10 may be a compound in which c is 4; L is —$CO_2$—; and J is 1,2,3,4-butanetetrayl or 1,2,4,5-benzenetetrayl.

In the case where the polymer compound in which c is 3 or 4 to thus form a star shape having three or four branches is used to prepare polyurethane, it may induce crosslinking and thus may be employed in preparation of thermosetting polyurethane.

A better understanding of the present invention may be obtained thanks to the following examples which are set forth to illustrate, but are not to be construed to limit the present invention.

PREPARATIVE EXAMPLE 1

Synthesis of Catalyst

A catalyst according to the present invention was prepared as shown below. A starting material, a compound A, was synthesized using a known method (*Bull. Korean Chem. Soc.* 2009, 30, 745-748).

A

Synthesis of Compound B

The compound A (100 mg, 0.054 mmol) and AgNO$_3$ (37.3 mg, 0.219 mmol) were dissolved in ethanol (3 mL) and then stirred overnight. The stirred solution was filtered using celite and the produced AgI was removed. The solvent was removed using vacuum decompression, thus obtaining a compound B in yellow solid powder form (0.80 g, 94%).

$^1$H NMR (CDCl$_3$): δ 3.51 (s, 2H, OH), 8.48 (s, 2H, CH=N), 7.15 (s, 4H, m-H), 3.44 (br, 2H, cyclohexyl-CH), 3.19 (br, 32H, NCH$_2$), 2.24 (s, 6H, CH$_3$), 1.57-1.52 (br, 4H, cyclohexyl-CH$_2$), 1.43-1.26 (br, 74H), 0.90-070. (br, 36H, CH$_3$) ppm.

Synthesis of Compound C

The compound B (95 mg, 0.061 mmol) and Co(OAc)$_2$ (10.7 mg, 0.061 mmol) were placed in a flask, and then added with methylene chloride (3 mL) and thus dissolved. The solution was stirred at room temperature for 3 hours under oxygen gas, and decompressed to remove the solvent, yielding a compound C in brown solid powder form (85 mg, 83%).

$^1$H NMR (DMSO-d$_6$, 38° C.): major signal set, δ 7.83 (s, 2H, CH=N) 7.27 (br s, 2H, m-H), 7.22, 7.19 (brs, 2H, m-H), 3.88 (br, 1H, cyclohexyl-CH), 3.55 (br, 1H, cyclohexyl-CH), 3.30-2.90 (br, 32H, NCH$_2$), 2.58 (s, 3H, CH$_3$, 2.55 (s, 3H, CH$_3$), 2.10-1.80 (br, 4H, cyclohexyl-CH$_2$), 1.70-1.15 (br m, 74H), 1.0-0.80 (br, 36H, CH$_3$) ppm; minor signal set, δ 7.65 (s, 2H, CH=N) 7.45 (s, 2H, m-H), 7.35 (s, 2H, m-H), 3.60 (br, 2H, cyclohexyl-CH), 3.30-2.90 (br, 32H, NCH$_2$), 2.66 (s, 6H, CH$_3$, 2.10-1.80 (br, 4H, cyclohexyl-CH$_2$, 1.70-1.15 (br m, 74H), 1.0-0.80 (br, 36H, CH$_3$) ppm.

$^1$H NMR (CD$_2$Cl$_2$): δ 7.65 (br, 2H, CH=N) 7.34 (br, 2H, m-H), 7.16 (br, 2H, m-H), 3.40-2.00 (br, 32H, NCH$_2$), 2.93 (br s, 6H, CH$_3$), 2.10-1.80 (br m, 4H, cyclohexyl-CH$_2$), 1.70-1.15 (br m, 74H), 1.1-0.80 (br, 36H, CH$_3$) ppm.

In $^1$H NMR spectrum obtained by dissolving the compound C in DMSO-d$_6$, two sets of signals were observed at a ratio of 6:4. The major signal set shows that two phenoxy ligands of the Salen monomer are different, and the minor signal set shows that two phenoxy ligands are identical. This is considered to be because the compound C is in an equilibrium state as will be described below in a DMSO solvent. It has been proved that the case where a substituent having small steric hindrance such as methyl is located at an ortho-position of two phenoxy ligands of the Salen monomer results in a structure in which the nitrogen of an imine is not coordinated in a polar solvent such as DMSO (*Inorg. Chem.* 2009, 48, 10455-10465). A single set of signals which is very broad was observed in methylene chloride which is a nonpolar solvent. Taking into consideration the weak coordination ability of the NO$_3^-$ anion, the following structure in which the nitrogen of an imine is coordinated and coordination and decoordination occur while nitrate anions and acetate anion are exchanged on two axial coordination planes is expected.

<Expected Structure of Compound C in DMSO>

Expected Structure of Compound C in CH$_2$Cl$_2$

EXAMPLE 1

Carbon Dioxide/Propylene Oxide Copolymerization Using Adipic Acid as Chain Transfer Agent and Catalyst Separation Copolymerization The compound C (3.0 mg, monomer/catalyst=100,000) obtained in Preparative Example 1 and propylene oxide (10.0 g, 172 mmol) were added into a 50 mL bomb reactor, and adipic acid was added in an amount of 10, 25, 50, 75, 100, 200, 300, 400, 500 times the mol of the catalyst as shown in Table 1 below, after which the reactor was assembled. A carbon dioxide gas pressure of 15 bar was applied to the reactor, and the reactor was then dipped in an oil bath at 73° C., followed by performing stirring. After 35 min, the internal temperature of the reactor reached 70° C. From that point in time, the pressure of the reactor was observed to decrease. The polymerization was carried out for 1 hour (Entry Nos. 1~9), 30 min (Entry No. 10) or 2 hours (Entry No. 11) from the point in time at which the internal temperature of the reactor reached 70° C. and the reaction was thus initiated. The reactor was dipped in a cooling bath and thus cooled, after which carbon dioxide gas was released, thereby terminating the reaction, resulting in a light yellow viscous solution.

Catalyst Separation

Figure 1:
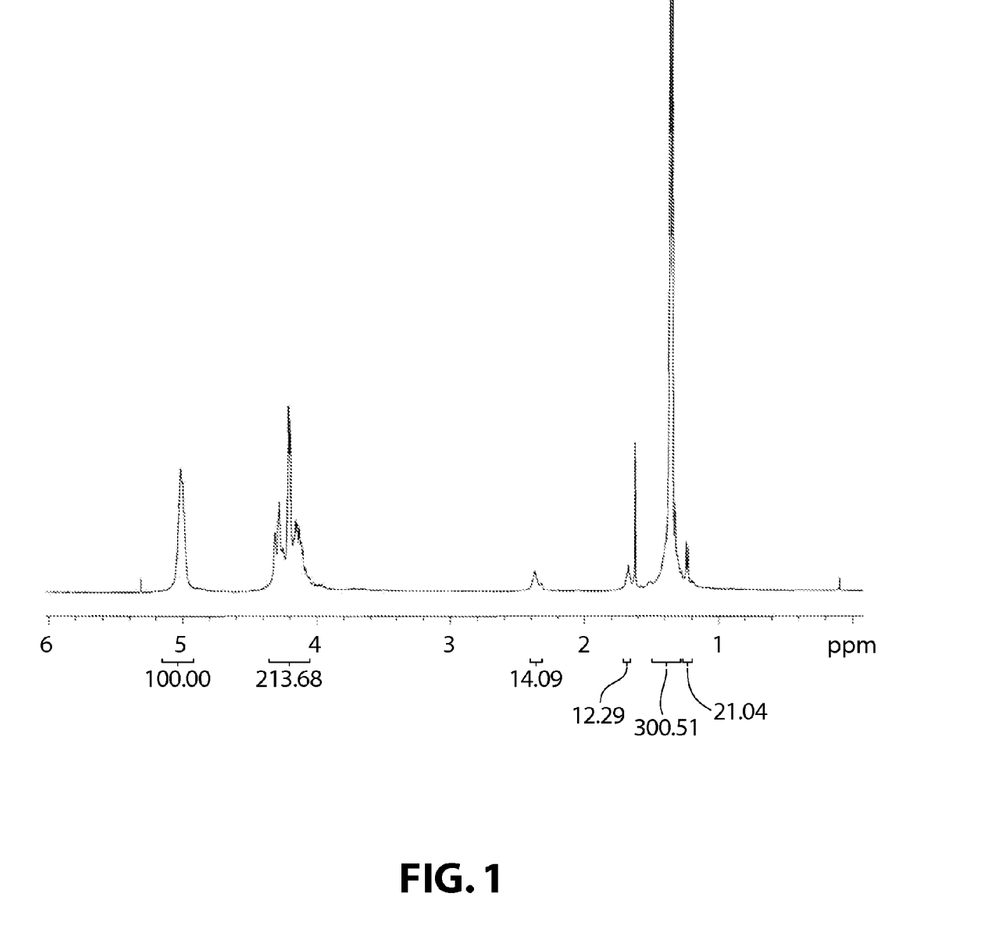
FIG. 1 shows $^1$H NMR spectrum of a polymer compound obtained using 300 equivalents of adipic acid as a chain transfer agent, in which no signal near 3.5 ppm indicates that complete alternating copolymerization was achieved, and the integral value indicates that the entire added chain transfer agent participated in chain growing.
Figure 2:
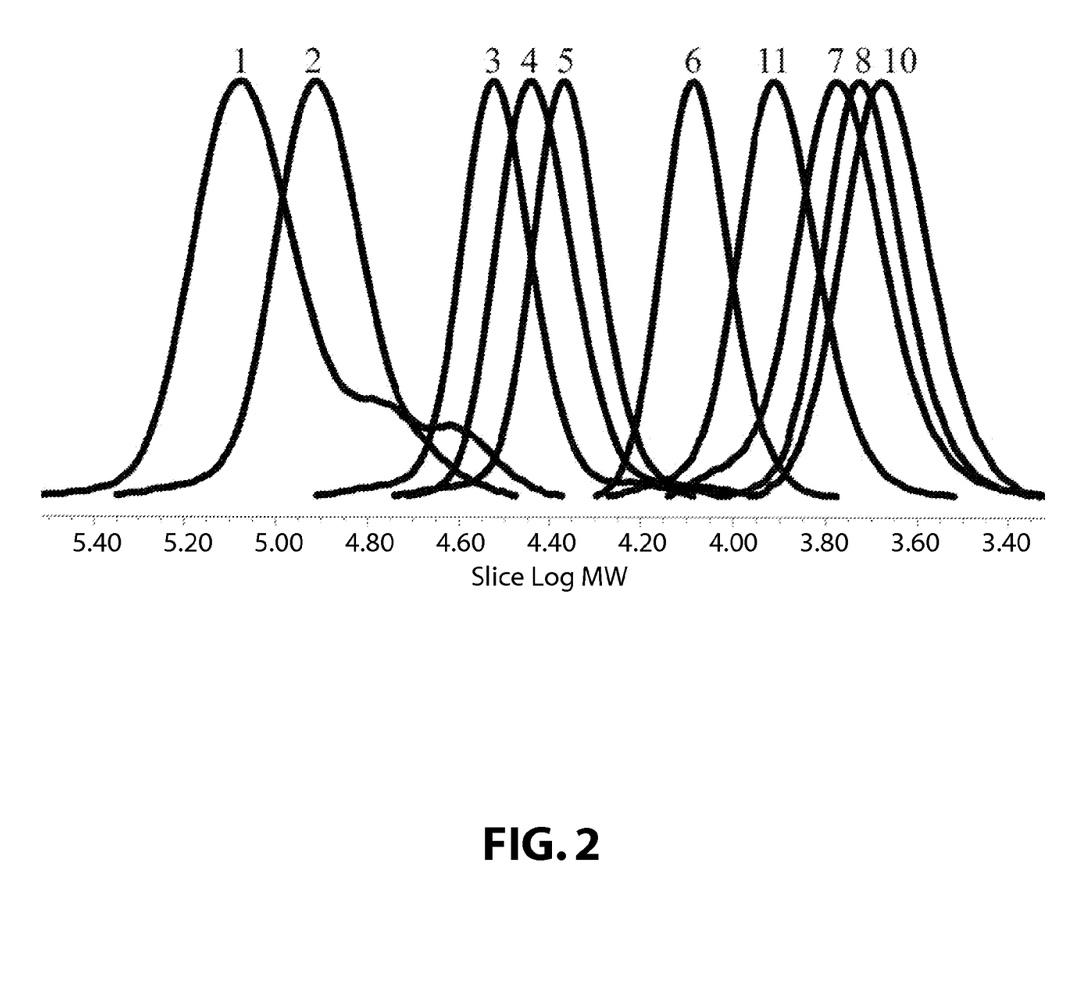
FIG. 2 shows the change in molecular weight and the narrow molecular weight distribution of the obtained polymer depending on the amount of added adipic acid and the polymerization time, in which numerals right above respective curves designate Entry Nos. of Table 1.

To the viscous solution was further added 10 g of propylene oxide in order to reduce the viscosity of the solution, after which the solution was passed through a silica gel (400 mg, available from Merck, 0.040~0.063 mm particle size (230~400 mesh) pad, yielding a colorless solution. The monomer was removed using vacuum decompression. In some cases, about 1~10% of a propylene carbonate by-product was produced. This propylene carbonate by-product was removed by storing the sample in a vacuum oven at 150° C. overnight. The copolymerization results are given in Table 1 below. FIG. 1 shows $^1$H NMR spectrum of the obtained polymer, in which there is no signal near 3.5 ppm, which indicates that complete alternating copolymerization was accomplished, and in which the integral value indicates that the entire added chain transfer agent participated in chain growing. FIG. 2 shows the molecular weight change and the narrow molecular weight distribution of the obtained polymer depending on the amount of added adipic acid and the polymerization time. The numerals right above respective curves designate Entry Nos. of Table 1.

As is apparent from Table 1, the molecular weight of the polymer can be seen to be precisely controlled depending on the amount of added adipic acid. Also as shown in Table 1 and FIG. 2, the molecular weight distribution (Mw/Mn) of the obtained polymer is about 1.05 which is evaluated to be considerably narrow, except for cases (Entry Nos. 1 and 2) where the added adipic acid equivalents are 10 and 25. The polymer chain begins to grow from four nitrate anions and one acetate anion of the catalyst C. The growing nitrate anions and acetate anion come to be alkoxy or carbonate anions, and these anions combine with protons of adipic acid added as the chain transfer agent via acid-base reaction. When the anions are neutralized by protons, the growth of the polymer chain stops. On the other hand, a chain begins to grow from the carboxyl anion of adipic acid where deprotonation occurred. The acid-base reaction by migration of protons is considerably rapid, and the entire polymer chain is uniformly grown from nitrate or acetate anions of the catalyst and also from the carboxyl group of adipic acid added as the chain transfer agent. Consequently, the polymer chain obtained by polymerization is a mixture comprising a polymer chain grown from nitrate or acetate anions and a polymer chain grown from adipic acid. The polymer grown from adipic acid is configured such that the polymer chain is grown in both directions, and the polymer grown from nitrate or acetate anions is configured such that the polymer chain is grown in one direction the length of which is half the length of the chain grown from adipic acid (Scheme 2 below). As seen in FIG. 2, a bimodal molecular weight distribution may be observed in the polymers of Entry Nos. 1 and 2 of Table 1. It is considered that the low molecular weight modal is grown from nitrate or acetate anions and the high molecular weight modal is grown in both directions from adipic acid. Because the amount of added adipic acid is considerably larger at Entry No. 3 or higher, the number (75 or more) of polymer chains grown in both direction from adipic acid is remarkably greater than the number (5) of polymer chains grown from nitrate or acetate anions, and the number of polymer chains grown from acetate anion is ignorable. Hence, the GPC curve of FIG. 2 is seen to be almost monomodal and the molecular weight distribution (Mw/Mn) is very small in a level of about 1.05.

The terminal group of the chain grown using the present catalyst is in carbonate or alkoxy anion form or in carbonic acid or alcohol form with a proton. When the obtained polymer is passed through silica, all carbonate or alkoxy anions

TABLE 1

Carbon Dioxide/Propylene Oxide Copolymerization using Adipic acid as Chain Transfer Agent

| Entry No. | Adipic acid Equivalents (Equivalent/Co) | Measured Molecular Weight (Mn)$^a$ | Molecular Weight Distribution (Mw/Mn) | TON$^b$ | Calculated Molecular Weight (Mn)$^c$ |
|---|---|---|---|---|---|
| 1 | 10 | 96800 | 1.15 | 14800 | 101000 |
| 2 | 25 | 69000 | 1.12 | 16400 | 55800 |
| 3 | 50 | 31500 | 1.05 | 11800 | 21900 |
| 4 | 75 | 27800 | 1.03 | 14500 | 18500 |
| 5 | 100 | 23600 | 1.04 | 14900 | 14500 |
| 6 | 200 | 12400 | 1.03 | 15700 | 7800 |
| 7 | 300 | 5900 | 1.07 | 10600 | 3500 |
| 8 | 400 | 5200 | 1.03 | 5700 | 1400 |
| 9$^d$ | 300 | 4500 | 1.05 | 7600 | 2500 |
| 10$^e$ | 300 | 7800 | 1.05 | 15300 | 5100 |

Note:
$^a$molecular weight measured using polystyrene as a standard by GPC.
$^b$turnover number calculated by measuring the mass of a polymer obtained after removing a propylene carbonate by-product.
$^c$molecular weight calculated from TON ([TON × 102.13]/[adipic acid equivalents + 5])

may be converted into carbonic acid or alcohol together with protons. In an atmosphere in which carbon dioxide has been released, carbonic acid discharges carbon dioxide and thus becomes alcohol. Specifically, in the terminal group of the polymer chain resulting from passing through silica to remove the catalyst, the chain grown from the chain transfer agent has both terminal groups in diol form, and the chain grown from nitrate or acetate anions of the catalyst includes a mono-ol type chain having one terminal group comprising $NO_3-$ or $CH_3CO_2-$ and the other terminal group comprising alcohol. Scheme 2 below shows a polymer chain growing process in the presence of a chain transfer agent.

[Scheme 2]

$X = NO_3-$ or $CH_3CO_2-$

Figure 3:
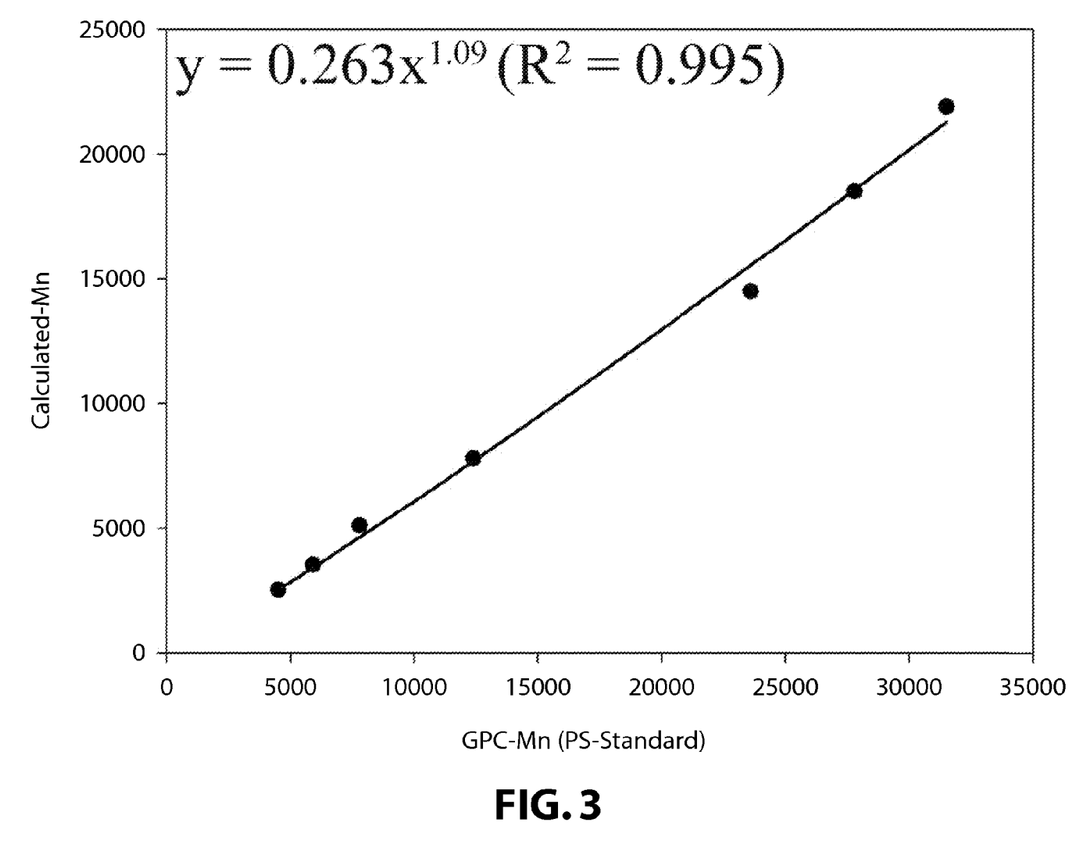
FIG. 3 shows a relationship between the molecular weight measured by GPC using polystyrene as a standard and the absolute molecular weight calculated from the turnover number (TON).

As the amount of added adipic acid increases, a polymer having a low molecular weight is obtained. Furthermore, in the case where the amount of adipic acid is equal to or much greater than the number of nitrate or acetate anions of the catalyst, all of the polymers have a narrow molecular weight distribution, from which the polymer chain is considered to be grown from the entire added adipic acid. The integral value of $^1H$ NMR of FIG. 1 indicates that the polymer chain is grown from the entire added adipic acid. In this case, the molecular weight (Mn) of the obtained polymer may be calculated from the turnover number (TON) of the polymerization reaction. Specifically, TON is multiplied by 102.13 which is the molecular weight of a repeating unit of an alternate copolymer and then divided by the total number of chains [adipic acid equivalents+5 (number of nitrate and acetate anions)], thus obtaining the molecular weight (Mn) of the polymer. In Table 1, the calculated molecular weight and the molecular weight measured by GPC can be seen to be uniformly different from each other. This difference is considered to be due to the use of polystyrene as a standard upon measurement by GPC. Upon measurement by GPC, although it is the most preferable that poly(propylene carbonate) which is the same polymer is used as a standard, poly(propylene carbonate) cannot purchase a sample for a standard. The molecular weight measured by GPC using polystyrene (PS) as a standard has a relation with the absolute molecular weight of the sample as represented by $KM^{a+1} = K_{(PS)}M_{(PS)}^{a(PS)+1}$. As such, M is the absolute molecular weight of poly(propylene carbonate), K and a are Mark-Houwink constants of poly(propylene carbonate), $M_{(PS)}$ is the molecular weight measured by GPC using PS as a standard, and $K_{(PS)}$ and $a(PS)$ are Mark-Houwink constants of PS. The above relation is derived on the assumption that the hydrodynamic volume (Vh) of poly(propylene carbonate) passed through GPC at any same point of time is the same as the hydrodynamic volume (Vh) of a PS standard the molecular weight of which was already determined at this point in time. Hydrodynamic volume (Vh) is defined as $KM^{a+1}/2.5 A$ (A is an Avogadro constant). In the above relation, "$KM^{a+1}=K_{(PS)}M^{a(PS)+1}$" may be converted in to $M=(K_{(PS)}/K)M_{(PS)}^{(a(PS)+1)/(a+1)}$. If the polymer chain is grown from the entire added adipic acids as expected, the absolute molecular weight (M) of poly(propylene carbonate) is the same as the molecular weight calculated from TON. As shown in FIG. 3, the absolute molecular weight (M, y axial value) calculated from TON and the molecular weight ($M_{(PS)}$, x axial value) measured by GPC using PS as a standard are fitted to $M=0.263M_{(PS)}^{1.09}$ ($R^2=0.995$). The Mark-Houwink constants K and a under GPC operating conditions (THF solvent, 25° C.) of poly(propylene carbonate) may be calculated from the above relation and Mark-Houwink constants $K_{(PS)}$ (0.011 mL/g) and a (0.725) of PS known under GPC operating conditions (THF solvent, 25° C.). The calculated K and a are 0.041 mL/g and 0.583, respectively.

EXAMPLE 2

Carbon Dioxide/Propylene Oxide Copolymerization Using Ethanol as Chain Transfer Agent and Catalyst Separation The polymerization reaction was carried out in the same manner as in Example 1, with the exception that ethanol (which is a compound of Formula 5 in which c is 1, LH is OH and J is ethyl) was used as a chain transfer agent, instead of adipic acid, and added in an amount 600 times or 1000 times the mol number of the catalyst, after which the catalyst was separated in the same manner. When the chain transfer agent was added 600 times, 2.98 g of a pure polymer was obtained, and this polymer had a TON of 16200, a molecular weight (Mn) of 4500 as measured by GPC using the PS standard, and a molecular weight distribution (Mw/Mn) of 1.05. When the chain transfer agent was added 1000 times, 1.56 g of a pure polymer was obtained, and this polymer had a TON of 8500, a molecular weight (Mn) of 1700 as measured by GPC using the PS standard, and a molecular weight distribution (Mw/Mn) of 1.04. $^1H$ NMR analysis showed that both of the two samples were a complete alternating copolymer.

EXAMPLE 3

Carbon Dioxide/Propylene Oxide Copolymerization Using Hexanoic Acid as Chain Transfer Agent and Catalyst Separation The polymerization reaction was carried out in the same manner as in Example 1, with the exception that hexanoic acid (which is a compound of Formula 5 in which c is 1, LH is COOH and J is pentyl) was used as a chain transfer agent, instead of adipic acid, and added in an amount 600 times the mol number of the catalyst, after which the catalyst was separated in the same manner. 2.40 g of a pure polymer was obtained, and this polymer had a TON of 13300, a molecular weight (Mn) of 3800 as measured by GPC using the PS standard, and a molecular weight distribution (Mw/Mn) of 1.06. $^1$H NMR analysis showed that the sample was a complete alternating copolymer.

EXAMPLE 4

Carbon Dioxide/Propylene Oxide Copolymerization Using Succinic Acid as Chain Transfer Agent and Catalyst Separation The polymerization reaction was carried out in the same manner as in Example 1, with the exception that succinic acid (which is a compound of Formula 5 in which c is 2, LH is COOH and J is —$CH_2CH_2$—) was used as a chain transfer agent, instead of adipic acid, and added in an amount 300 times the mol number of the catalyst, after which the catalyst was separated in the same manner. 1.78 g of a pure polymer was obtained, and this polymer had a TON of 9700, a molecular weight (Mn) of 5500 as measured by GPC using the PS standard, and a molecular weight distribution (Mw/Mn) of 1.04. $^1$H NMR analysis showed that the sample was a complete alternating copolymer.

EXAMPLE 5

Carbon Dioxide/Propylene Oxide Copolymerization Using Ethyleneglycol as Chain Transfer Agent and Catalyst Separation The polymerization reaction was carried out in the same manner as in Example 1, with the exception that ethyleneglycol (which is a compound of Formula 5 in which c is 2, LH is OH and J is —$CH_2CH_2$—) was used as a chain transfer agent, instead of adipic acid, and added in an amount 300 times the mol number of the catalyst, after which the catalyst was separated in the same manner. 1.71 g of a pure polymer was obtained, and this polymer had a TON of 9300, a molecular weight (Mn) of 5200 as measured by GPC using the PS standard, and a molecular weight distribution (Mw/Mn) of 1.04. $^1$H NMR analysis showed that the sample was a complete alternating copolymer.

EXAMPLE 6

Carbon Dioxide/Propylene Oxide Copolymerization Using Diethyleneglycol as Chain Transfer Agent and Catalyst Separation The polymerization reaction was carried out in the same manner as in Example 1, with the exception that diethyleneglycol (which is a compound of Formula 5 in which c is 2, LH is OH and J is —$CH_2CH_2OCH_2CH_2$—) was used as a chain transfer agent, instead of adipic acid, and added in an amount 100 times, 300 times or 500 times the mol number of the catalyst, after which the catalyst was separated in the same manner. When the chain transfer agent was added 100 times, 2.42 g of a pure polymer was obtained and this polymer had a TON of 13500, a molecular weight (Mn) of 19800 as measured by GPC using the PS standard, and a molecular weight distribution (Mw/Mn) of 1.03. When the chain transfer agent was added 300 times, 1.62 g of a pure polymer was obtained and this polymer had a TON of 8900, a molecular weight (Mn) of 5400 as measured by GPC using the PS standard, and a molecular weight distribution (Mw/Mn) of 1.04. When the chain transfer agent was added 500 times, 1.12 g of a pure polymer was obtained and this polymer had a TON of 6700, a molecular weight (Mn) of 2500 as measured by GPC using the PS standard, and a molecular weight distribution (Mw/Mn) of 1.05. $^1$H NMR analysis showed that all of the samples were a complete alternating copolymer.

The present example shows that the ether group causes no problems in the preparation method according to the present invention.

EXAMPLE 7

Carbon Dioxide/Propylene Oxide Copolymerization Using N-Phenyldiethanolamine as Chain Transfer Agent and Catalyst Separation The polymerization reaction was carried out in the same manner as in Example 1, with the exception that N-phenyldiethanolamine (which is a compound of Formula 5 in which c is 2, LH is OH and J is —$CH_2CH_2N(Ph)CH_2CH_2$—) was used as a chain transfer agent, instead of adipic acid, and added in an amount 100 times or 200 times the mol number of the catalyst, after which the catalyst was separated in the same manner. When the chain transfer agent was added 100 times, 3.15 g of a pure polymer was obtained and this polymer had a TON of 17000, a molecular weight (Mn) of 26400 as measured by GPC using the PS standard, and a molecular weight distribution (Mw/Mn) of 1.05. When the chain transfer agent was added 200 times, 1.12 g of a pure polymer was obtained and this polymer had a TON of 6100, a molecular weight (Mn) of 5300 as measured by GPC using the PS standard, and a molecular weight distribution (Mw/Mn) of 1.06. $^1$H NMR analysis showed that both of the two samples were a complete alternating copolymer.

The present example shows that the amine group causes no problems in the preparation method according to the present invention.

EXAMPLE 8

Carbon Dioxide/Propylene Oxide Copolymerization Using 4-Hydroxybenzoic Acid as Chain Transfer Agent and Catalyst Separation The polymerization reaction was carried out in the same manner as in Example 1, with the exception that 4-hydroxybenzoic acid (which is a compound of Formula 5 in which c is 2, one of two LHs is —OH and the other thereof is —$CO_2H$, and J is para-phenylene) was used as a chain transfer agent, instead of adipic acid, and added in an amount 300 times the mol number of the catalyst, after which the catalyst was separated in the same manner. 2.00 g of a pure polymer was obtained and this polymer had a TON of 109000, a molecular weight (Mn) of 6600 as measured by GPC using the PS standard, and a molecular weight distribution (Mw/Mn) of 1.04. $^1$H NMR analysis showed that the sample was a complete alternating copolymer.

EXAMPLE 9

Carbon Dioxide/Propylene Oxide Copolymerization Using 1,2,3-Propanetricarboxylic Acid as Chain Transfer Agent and Catalyst Separation The polymerization reaction was carried out in the same manner as in Example 1, with the exception that 1,2,3-propanetricarboxylic acid (which is a compound of Formula 5 in which c is 3, LH is —$CO_2H$ and J is 1,2,3-propanetriyl) was used as a chain transfer agent, instead of adipic acid, and added in an amount 100 times, 133 times or 200 times the mol number of the catalyst, after which the catalyst was separated in the same manner. When the chain transfer agent was added 100 times, 2.40 g of a pure polymer was obtained and this polymer had a TON of 13000, a molecular weight (Mn) of 18800 as measured by GPC using the PS standard, and a molecular weight distribution (Mw/Mn) of 1.03. When the chain transfer agent was added 133 times, 1.42 g of a pure polymer was obtained and this polymer had a TON of 7700, a molecular weight (Mn) of 8000 as measured by GPC using the PS standard, and a molecular weight distribution (Mw/Mn) of 1.04. When the chain transfer agent was added 200 times, 1.49 g of a pure polymer was obtained and this polymer had a TON of 8100, a molecular weight (Mn) of 6200 as measured by GPC using the PS standard, and a molecular weight distribution (Mw/Mn) of 1.04. $^1$H NMR analysis showed that all of the three samples were a complete alternating copolymer.

EXAMPLE 10

Carbon Dioxide/Propylene Oxide Copolymerization Using 1,2,4-Benzenetricarboxylic Acid as Chain Transfer Agent and Catalyst Separation The polymerization reaction was carried out in the same manner as in Example 1, with the exception that 1,2,4-benzenetricarboxylic acid (which is a compound of Formula 5 in which c is 3, LH is —$CO_2H$ and J is 1,2,4-benzenetriyl) was used as a chain transfer agent, instead of adipic acid, and added in an amount 200 times the mol number of the catalyst, after which the catalyst was separated in the same manner. 1.12 g of a pure polymer was obtained, and this polymer had a TON of 6000, a molecular weight (Mn) of 4500 as measured by GPC using the PS standard, and a molecular weight distribution (Mw/Mn) of 1.05. $^1$H NMR analysis showed that the sample was a complete alternating copolymer.

EXAMPLE 11

Carbon Dioxide/Propylene Oxide Copolymerization Using 1,2,3,4-Butanetetracarboxylic Acid as Chain Transfer Agent and Catalyst Separation

The polymerization reaction was carried out in the same manner as in Example 1, with the exception that 1,2,3,4-butanetetracarboxylic acid (which is a compound of Formula 5 in which c is 4, LH is —$CO_2H$ and J is 1,2,3,4-butanetetrayl) was used as a chain transfer agent, instead of adipic acid, and added in an amount 150 times the mol number of the catalyst, after which the catalyst was separated in the same manner. 2.01 g of a pure polymer was obtained, and this polymer had a TON of 9200, a molecular weight (Mn) of 4200 as measured by GPC using the PS standard, and a molecular weight distribution (Mw/Mn) of 1.03. $^1$H NMR analysis showed that the sample was a complete alternating copolymer.

As described hereinbefore, the present invention provides precise control of the molecular weight and chain shape when carrying out alternating copolymerization of carbon dioxide and epoxide and the preparation of a low-molecular-weight poly(alkylene carbonate) thereby. According to the present invention, a chain transfer agent is added to the copolymerization of carbon dioxide and epoxide, and thus poly(alkylene carbonate) in which the molecular weight and polymer chain shape are precisely controlled depending on the amount and shape of the chain transfer agent can be prepared. The polymer thus precisely controlled provides a method of precisely controlling the molecular weight and molecular weight distribution of poly(alkylene carbonate), thus diversifying the applications of poly(alkylene carbonate) alone. In addition, the polymer prepared using the above method has an alcohol terminal group and thus can be easily utilized to prepare polyurethane.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A method of preparing poly (alkylene carbonate), comprising:
   alternating copolymerizing carbon dioxide and one or more epoxide compounds, in the presence of a compound represented by Formula 5 using a complex compound represented by Formula 1 as a catalyst,
   wherein the one or more epoxide compounds is selected from the group consisting of (C2-C20)alkylene oxide substituted or unsubstituted with halogen, (C1-C20) alkyloxy, (C6-C20)aryloxy or (C6-C20)ar(C1-C20) alkyloxy; (C4-C20)cycloalkylene oxide substituted or unsubstituted with halogen, (C1-C20)alkyloxy, (C6-C20)aryloxy or (C6-C20)ar(C1-C20)alkyloxy; and (C8-C20)styrene oxide substituted or unsubstituted with halogen, (C1-C20)alkyloxy, (C6-C20)aryloxy, (C6-C20)ar(C1-C20)alkyloxy or (C1-C20)alkyl wherein the complex compound of [Formula 1] is represented by:

[Formula 1]

wherein M is trivalent cobalt or trivalent chromium;
A is an oxygen or sulfur atom;
Q is a diradical that connects two nitrogen atoms;
$R^1$ to $R^{10}$ are each independently hydrogen; halogen; (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20) aryl containing one or more selected from among halogen, nitrogen, oxygen, silicon, sulfur and phosphorus; (C6-C20)aryl(C1-C20)alkyl; (C6-C20)aryl(C1-C20) alkyl containing one or more selected from among halogen, nitrogen, oxygen, silicon, sulfur and phosphorus; (C1-C20)alkoxy; (C6-C30)aryloxy; formyl; (C1-C20) alkylcarbonyl; (C6-C20)arylcarbonyl; or a metalloid radical of Group 14 metal substituted with hydrocarbyl;

two of $R^1$ to $R^{10}$ are able to be linked with each other to form a ring;

at least one of hydrogens included in $R^1$ to $R^{10}$ and Q is substituted with a proton group independently selected from among Formula a, Formula b and Formula c as represented below:

[Formula a]

[Formula b]

[Formula c]

$X-$ is independently a halogen anion; $HCO_3^-$; $BF_4^-$; $ClO_4^-$; $NO_3^-$; $PF_6^-$; a (C6-C20)aryloxy anion; a (C6-C20)aryloxy anion containing one or more selected from among a halogen atom, a nitrogen atom, an oxygen atom, a silicon atom, a sulfur atom and a phosphorus atom; a (C1-C20)alkylcarboxyl anion; a (C1-C20)alkylcarboxyl anion containing one or more selected from among a halogen atom, a nitrogen atom, an oxygen atom, a silicon atom, a sulfur atom and a phosphorus atom; a (C6-C20)arylcarboxyl anion; a (C6-C20)arylcarboxyl anion containing one or more selected from among a halogen atom, a nitrogen atom, an oxygen atom, a silicon atom, a sulfur atom and a phosphorus atom; a (C1-C20)alkoxy anion; a (C1-C20)alkoxy anion containing one or more selected from among a halogen atom, a nitrogen atom, an oxygen atom, a silicon atom, a sulfur atom and a phosphorus atom; a (C1-C20)alkylcarbonate anion; a (C1-C20)alkylcarbonate anion containing one or more selected from among a halogen atom, a nitrogen atom, an oxygen atom, a silicon atom, a sulfur atom and a phosphorus atom; a (C6-C20) arylcarbonate anion; a (C6-C20)arylcarbonate anion containing one or more selected from among a halogen atom, a nitrogen atom, an oxygen atom, a silicon atom, a sulfur atom and a phosphorus atom; a (C1-C20)alkylsulfonate anion; a (C1-C20)alkylsulfonate anion containing one or more selected from among a halogen atom, a nitrogen atom, an oxygen atom, a silicon atom, a sulfur atom and a phosphorus atom; a (C1-C20)alkylamido anion; a (C1-C20)alkylamido anion containing one or more selected from among a halogen atom, a nitrogen atom, an oxygen atom, a silicon atom, a sulfur atom and a phosphorus atom; a (C6-C20)arylamido anion; a (C6-C20)arylamido anion containing one or more selected from among a halogen atom, a nitrogen atom, an oxygen atom, a silicon atom, a sulfur atom and a phosphorus atom; a (C1-C20)alkylcarbamate anion; a (C1-C20)alkylcarbamate anion containing one or more selected from among a halogen atom, a nitrogen atom, an oxygen atom, a silicon atom, a sulfur atom and a phosphorus atom; a (C6-C20)arylcarbamate anion; or a (C6-C20)arylcarbamate anion containing one or more selected from among a halogen atom, a nitrogen atom, an oxygen atom, a silicon atom, a sulfur atom and a phosphorus atom;

Z is a nitrogen or phosphorus atom;

$R^{21}$, $R^{22}$, $R^{23}$, $R^{31}$, $R^{32}$, $R^{33}$, $R^{34}$ and $R^{35}$ are each independently (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; or a metalloid radical of Group 14 metal substituted with hydrocarbyl; two of $R^{21}$, $R^{22}$ and $R^{23}$ or two of $R^{31}$, $R^{32}$, $R^{33}$, $R^{34}$ and $R^{35}$ are able to be linked with each other to form a ring;

$R^{41}$, $R^{42}$ and $R^{43}$ are each independently hydrogen; (C1-C20)alkyl; (C1-C20)alkyl containing one or more selected from among halogen, nitrogen, oxygen, silicon, sulfur and phosphorus; (C2-C20)alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; or a metalloid radical of Group 14 metal substituted with hydrocarbyl; two of $R^{41}$, $R^{42}$ and $R^{43}$ are able to be linked with each other to form a ring;

X' is an oxygen atom, a sulfur atom or N—R (wherein R is (C1-C20) alkyl);

n is an integer obtained by adding 1 to a total number of proton groups included in $R^1$ to $R^{10}$ and Q;

$X^-$ is able to be coordinated to M; and a nitrogen atom of imine is able to be decoordinated from M; and wherein the compound of [Formula 5] is represented by:

$$J(LH)_c \qquad \text{[Formula 5]}$$

wherein J is a C1-C60 hydrocarbyl c-valent radical with or without an ether group, an ester group or an amine group; LH is —OH or —CO$_2$H; and c is an integer from 1 to 10, in which LH is identical or different when c is 2 or more.

2. The method as set forth in claim 1, wherein M is trivalent cobalt;

A is oxygen;

Q is trans-1,2-cyclohexylene, phenylene or ethylene;

$R^1$ and $R^2$, which are identical or different, are (C1-C20) primary alkyl;

$R^3$ to $R^{10}$ are each independently hydrogen or —[YR$^{51}_{3-a}$\{(CR$^{52}$R$^{53}$)$_b$N$^+$R$^{54}$R$^{55}$R$^{56}$\}$_a$];

Y is C or Si;

$R^{51}$, $R^{52}$, $R^{53}$, $R^{54}$, $R^{55}$ and $R^{56}$ are each independently hydrogen; halogen; (C1-C20)alkyl; (C1-C20)alkyl containing one or more selected from among halogen, nitrogen, oxygen, silicon, sulfur and phosphorus; (C2-C20) alkenyl; (C2-C20)alkenyl containing one or more selected from among halogen, nitrogen, oxygen, silicon, sulfur and phosphorus; (C1-C20)alkyl(C6-C20)aryl; (C1-C20)alkyl(C6-C20)aryl containing one or more selected from among halogen, nitrogen, oxygen, silicon, sulfur and phosphorus; (C6-C20)aryl(C1-C20)alkyl; (C6-C20)aryl(C1-C20)alkyl containing one or more selected from among halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a metalloid radical of Group 14 metal substituted with hydrocarbyl, two of $R^{54}$, $R^{55}$ and $R^{56}$ being able to be linked with each other to form a ring;

a is an integer from 1 to 3, and b is an integer from 1 to 20; and n is an integer of 4 or more obtained by adding 1 to a total number of quaternary ammonium salts included in $R^3$ to $R^{10}$, provided that at least three of $R^3$ to $R^{10}$ are $-[YR^{51}_{3-a}\{(CR^{52}R^{53})_b N^+ R^{54}R^{55}R^{56}\}_a]$ when a is 1, at least two of $R^3$ to $R^{10}$ are $-[YR^{51}_{3-a}\{(CR^{52}R^{53})_b N^+ R^{54}R^{55}R^{56}\}_a]$ when a is 2, or one or more of $R^3$ to $R^{10}$ are $-[YR^{51}_{3-a}\{(CR^{52}R^{53})_b N^+ R^{54}R^{55}R^{56}\}_a]$ when a is 3.

3. The method as set forth in claim 2, wherein used as the catalyst is a complex compound represented by Formula 7 below:

[Formula 7]

wherein $R^{61}$ and $R^{62}$ are each independently methyl or ethyl; n is an integer from 1 to 20; $X^-$ is independently a nitrate or acetate anion; nitrogen of imine is able to be coordinated to or decoordinated from cobalt, respective anions being able to be coordinated to cobalt.

4. The method as set forth in claim 1, wherein in the compound represented by Formula 5, c is 1; and J is a C1-C60 hydrocarbyl radical with or without an ether group, an ester group or an amine group.

5. The method as set forth in claim 1, wherein in the compound represented by Formula 5, c is 2; and J is a C1-C60 hydrocarbyl diradical with or without an ether group, an ester group or an amine group.

6. The method as set forth in claim 5, wherein in the compound represented by Formula 5, LH is $-CO_2H$; and J is $-[CR_2]-$ (n is an integer from 0 to 20; and R which is identical or different is hydrogen, methyl, ethyl, propyl or butyl), para-phenylene, meta-phenylene, ortho-phenylene or 2,6-naphthalenediyl.

7. The method as set forth in claim 5, wherein in the compound represented by Formula 5, LH is $-OH$; and J is $-[CR_2]-$ (n is an integer from 0 to 20; and R which is identical or different is hydrogen, methyl, ethyl, propyl or butyl), $-CH_2CH_2N(R)CH_2CH_2-$ (R is C1-C20 hydrocarbyl) or $-[CH_2CH(R)O]_n CH_2CH(R)-$ (n is an integer from 0 to 10; and R is hydrogen or methyl).

8. The method as set forth in claim 5, wherein in the compound represented by Formula 5, one of two LHs is $-OH$ and the other thereof is $-CO_2H$, and J is phenylene.

9. The method as set forth in claim 1, wherein in the compound represented by Formula 5, c is 3; and J is a C1-C60 hydrocarbyl triradical with or without an ether group, an ester group or an amine group.

10. The method as set forth in claim 9, wherein in the compound represented by Formula 5, LH is $-CO_2H$; and J is 1,2,3-propanetriyl, 1,2,3-benzenetriyl, 1,2,4-benzenetriyl or 1,3,5-benzenetriyl.

11. The method as set forth in claim 1, wherein in the compound represented by Formula 5, c is 4; and J is a C1-C60 hydrocarbyl tetraradical with or without an ether group, an ester group or an amine group.

12. The method as set forth in claim 11, wherein in the compound represented by Formula 5, LH is $-CO_2H$; and J is 1,2,3,4-butanetetrayl or 1,2,4,5-benzenetetrayl.

13. A method of preparing poly(alkylene carbonate), comprising:

preparing a poly(alkylene carbonate) copolymer using the method as set forth in claim 1; and bringing a solution comprising the copolymer and a catalyst dissolved therein into contact with a solid inorganic material, a solid polymer material or a mixture thereof which does not dissolve in the solution, thus forming a composite of the solid inorganic material or polymer material and the catalyst, so that the copolymer and the catalyst separate from each other.

14. The method as set forth in claim 13, wherein the solid inorganic material is a silica or alumina which has been surface modified or not, and the solid polymer material is a polymer material having a functional group able to cause deprotonation by an alkoxy anion.

* * * * *

UNITED STATES PATENT AND TRADEMARK OFFICE
CERTIFICATE OF CORRECTION

PATENT NO. : 8,530,616 B2
APPLICATION NO. : 12/952642
DATED : September 10, 2013
INVENTOR(S) : JiSu Jeong et al.

It is certified that error appears in the above-identified patent and that said Letters Patent is hereby corrected as shown below:

In the Claims:

Column 25, Line 28, Claim 1, delete "X-" and insert -- $X^-$ --

Column 28, Line 3, Claim 6, delete "-[CR$_2$]-" and insert -- -[CR$_2$]$_n$- --

Column 28, Line 9, Claim 7, delete "-[CR$_2$]-" and insert -- -[CR$_2$]$_n$- --

Signed and Sealed this
Fourteenth Day of January, 2014

Michelle K. Lee
*Deputy Director of the United States Patent and Trademark Office*